(12) United States Patent
Atake

(10) Patent No.: US 6,887,572 B2
(45) Date of Patent: May 3, 2005

(54) DECORATIVE SHEET AND SHEET-DECORATED MOLDING CONTAINING (METH) ACRYLATE POLYMERS

(75) Inventor: Hiroyuki Atake, Shinjuku-Ku (JP)

(73) Assignee: Dai Nippon Printing Co., Ltd. (JP)

(*) Notice: Subject to any disclaimer, the term of this patent is extended or adjusted under 35 U.S.C. 154(b) by 0 days.

(21) Appl. No.: 09/397,034

(22) Filed: Sep. 16, 1999

(65) Prior Publication Data

US 2002/0142181 A1 Oct. 3, 2002

Related U.S. Application Data

(62) Division of application No. 08/957,068, filed on Oct. 24, 1997, now Pat. No. 6,001,292.

(30) Foreign Application Priority Data

Oct. 30, 1996 (JP) .............................................. 8-288014

(51) Int. Cl.⁷ .............................................. B32B 27/08
(52) U.S. Cl. ........................ 428/409; 428/500; 428/515; 428/516; 428/520; 428/908.8
(58) Field of Search ................................ 428/409, 500, 428/515, 516, 517, 908.8; 264/135, 513, 269, 510, 511, 267

(56) References Cited

U.S. PATENT DOCUMENTS

| 4,386,042 A | | 5/1983 | Tatebayashi ................. 264/266 |
| 4,404,276 A | * | 9/1983 | Steklenski ................... 430/531 |
| 4,693,507 A | | 9/1987 | Dressen et al. ........... 296/39 R |
| 4,898,706 A | | 2/1990 | Yabe et al. ................... 264/266 |
| 4,956,241 A | * | 9/1990 | Chu et al. .................... 428/516 |
| 4,981,758 A | * | 1/1991 | Chu et al. .................... 428/516 |
| 5,096,784 A | * | 3/1992 | Culbertson et al. .......... 428/482 |
| 5,110,685 A | | 5/1992 | Cross et al. ................. 428/494 |
| 5,141,658 A | | 8/1992 | Dibiase ........................ 252/47 |
| 5,268,215 A | * | 12/1993 | Krenceski et al. ........... 428/213 |
| 5,302,459 A | * | 4/1994 | Kim et al. .................... 428/447 |
| 5,354,397 A | | 10/1994 | Miyake et al. ............... 264/266 |
| 5,424,135 A | * | 6/1995 | Murata et al. ............... 428/517 |
| 5,456,949 A | * | 10/1995 | Albrinck et al. ............. 427/411 |
| 5,589,121 A | | 12/1996 | Inagaki et al. .............. 264/266 |
| 5,603,889 A | | 2/1997 | Ohno .......................... 264/513 |
| 5,660,891 A | | 8/1997 | Kenyon et al. .............. 427/445 |
| 5,707,581 A | | 1/1998 | Yamazaki .................... 264/266 |
| 5,833,916 A | | 11/1998 | Takada et al. ............... 264/494 |

FOREIGN PATENT DOCUMENTS

| JP | 64-57032 | 4/1989 |
| JP | 01-200958 | 8/1989 |
| JP | 04-268313 | 9/1992 |
| JP | 07-009484 | 1/1995 |
| JP | 07-286129 | * 10/1995 |
| JP | 08-183064 | 7/1996 |
| JP | 08-276554 | 10/1998 |

* cited by examiner

*Primary Examiner*—Monique R. Jackson
(74) *Attorney, Agent, or Firm*—Parkhurst & Wendel, L.L.P.

(57) ABSTRACT

A decorative sheet formed by coating a surface of an acrylic resin sheet having a coefficient of kinetic friction with respect to a flat glass plate in the range of 0.2 to 0.9 and a glass transition temperature of 80° C. or below with a pattern layer is inserted in a female mold and a male mold of an injection mold, the decorative sheet is clamped to the female mold, the female and the male mold are joined together to form a cavity in the injection mold, a fluid resin is injected into the cavity so as to fill up the cavity, the resin filling up the cavity is solidified in a sheet-decorated molding having a surface coated with the decorative sheet, the injection mold is opened and the sheet-decorated molding is ejected from the female mold.

12 Claims, 3 Drawing Sheets

F I G. I

DECORATIVE SHEET AND SHEET-DECORATED MOLDING CONTAINING (METH) ACRYLATE POLYMERS

This is a Division of application Ser. No. 08/957,068 filed Oct. 24, 1997 now U.S. Pat. No. 6,001,292.

BACKGROUND OF THE INVENTION

1. Field of the Invention

The present invention relates to a sheet-decorating molding method for laminating a decorative sheet to the surface of a resin molding to produce a sheet-decorated molding provided on its surface with a pattern.

2. Description of the Related Art

A sheet-decorating injection molding method for forming a pattern on the surface of a resin molding has been prevalently used. This known sheet-decorating injection molding method attaches a decorative sheet to the surface of a molding by holding a decorative sheet between the male and the female mold of an injection mold, joining the male and the female mold, clamping the injection mold, injecting a fluid resin into a cavity formed in the injection mold to fill up the cavity. This sheet-decorating injection molding method often uses acrylic resin sheets because acrylic resin sheets are satisfactory in transparency, weather resistance, adhesion and thermoforming property. However, acrylic resin sheets laminated to the surfaces of moldings are liable to be damaged. A method proposed to protect an acrylic resin sheet from damage involves coating the surfaces of the acrylic resin sheet with a hard film of an ultraviolet-setting or electron-beam setting material. If the surface of the molding has a complicated shape like that formed by deep drawing or that having portions having large curvatures, a decorative sheet to be laminated to a molding needs to be formed so as to conform to the surface of the cavity of an injection mold for preforming. When thus preforming a decorative sheet, the hard film coating the surface of the decorative sheet affects adversely to the formability of the decorative sheet.

SUMMARY OF THE INVENTION

The present invention has been made in view of the foregoing problems and it is therefore an object of the present invention to provide a sheet-decorated molding formed by laminating a decorative sheet of an acrylic resin to a molding and highly resistant to abrasion, and a sheet-decorating molding method for producing such a sheet-decorated molding.

The present invention controls the kinetic friction of the surface of a decorative sheet to a value in an appropriate range to improve the abrasion resistance of the decorative sheet. More specifically, the present invention employs an acrylic resin decorative sheet having a coefficient of kinetic friction in the range of 0.2 to 0.9 with respect to a flat glass plate, more preferably, an acrylic resin decorative sheet having the foregoing coefficient of kinetic friction with respect to a flat glass plate and a glass transition temperature of 80° C. or below. A laminated decorative sheet formed by laminating the foregoing acrylic resin decorative sheet and a backing resin sheet may be used. An acrylic resin sheet having a coefficient of kinetic friction of 0.9 or below with respect to a flat glass plate has sufficiently high abrasion resistance and satisfactory formability even if the glass transition temperature Tg of the acrylic resin sheet is not very high and the acrylic resin sheet is not coated with a hard film. An acrylic resin sheet having a coefficient of kinetic friction of 0.2 or above with respect to a flat glass plate will not be creased, broken, strained or dislocated by a stress induced therein when a fluid resin is injected at a high injection pressure into the cavity of an injection mold holding the acrylic resin sheet.

A sheet-decorated molding according to the present invention is made by laminating a decorative sheet to the surface of a resin molding. If a decorative sheet formed by laminating an acrylic resin sheet and a backing resin sheet is used, the decorative sheet is laminated to a resin molding with the acrylic resin sheet on the outer side.

A sheet-decorating molding method according to the present invention for producing the foregoing sheet-decorated molding comprises the steps of joining together a male mold and a female mold of an injection mold with the decorating sheet held between the male and the female mold, clamping the injection mold to define a cavity, injecting a fluidized resin through a gate formed in the male mold to fill up the cavity with the fluidized resin, solidifying the fluidized resin so that the decorating sheet is laminated to the surface of a molding, opening the injection mold, and ejecting a sheet-decorated molding formed by laminating the decorating sheet to the surface of the resin molding from the injection molding. If a laminated decorative sheet formed by laminating an acrylic resin decorative sheet and a backing resin sheet are used, the laminated decorative sheet is held between the male and the female mold so that the acrylic resin decorative sheet is on the side of the female mold.

The above and other objects, features and advantages of the present invention will become more apparent from the following description taken in connection with the accompanying drawings.

DESCRIPTION OF THE PREFERRED EMBODIMENTS

Figure 1:
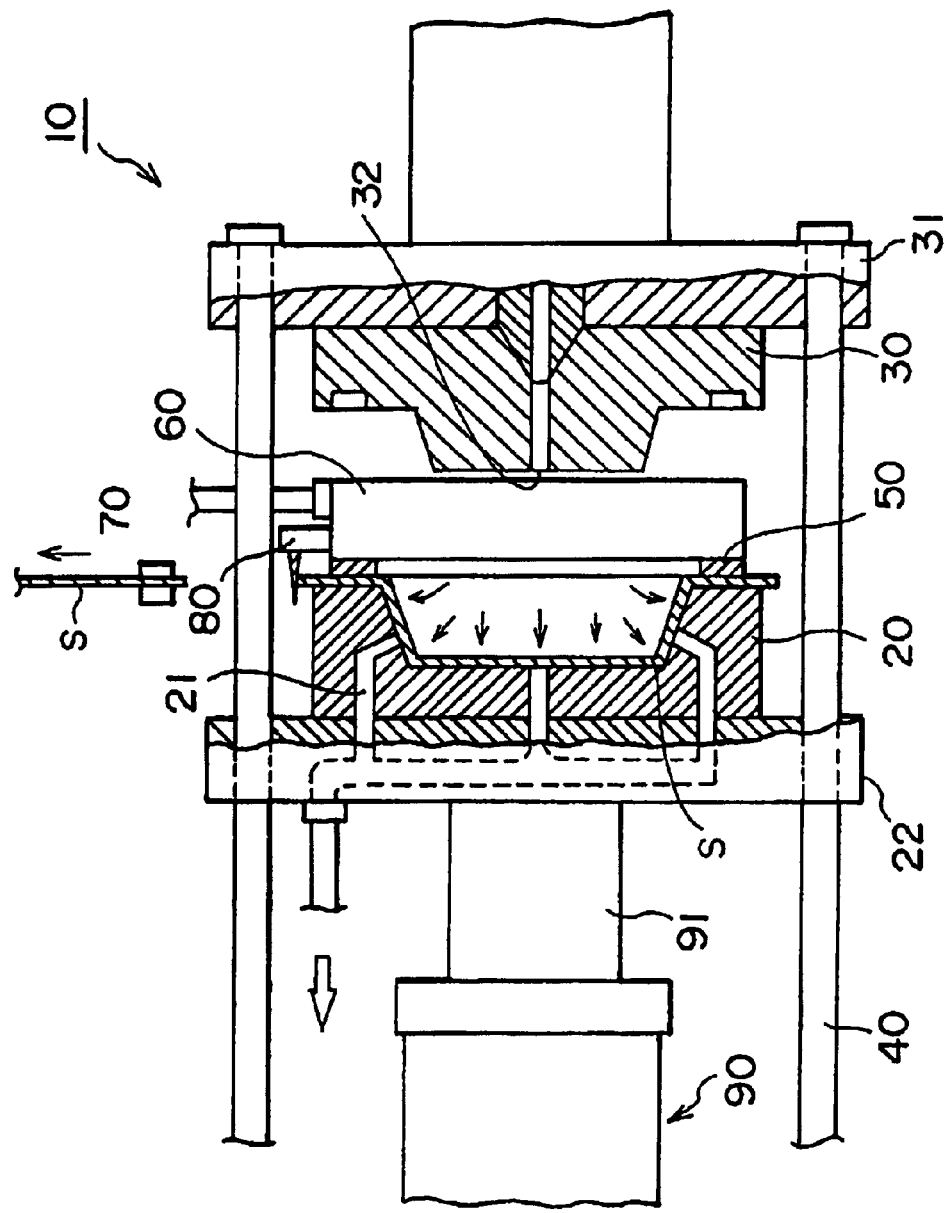
FIG. 1 is a partly sectional view of an injection molding machine in a preforming process for preforming e a decorative sheet on a female mold of an injection mold.

Suitable materials for forming an acrylic resin decorative sheet in accordance with the present invention are homopolymers of (meth)acrylate or copolymers containing a (meth)acrylate, such as polymethyl (meth)acrylates, polyethyl (meth)acrylates, polybutyl (meth)acrylates, methyl (meth)acrylate-butyl (meth)acrylate copolymers, methyl (meth)acrylate-ethyl (meth)acrylate copolymers, ethyl (meth)acrylate-butyl (meth)acrylate copolymers and (meth)acrylate-styrene copolymers. In this specification, the term, "(meth)acrylate" designates an acrylate or a methacrylate. Although acrylic resin sheets of 50 to 300 $\mu$m in thickness are used generally, the present invention may employ acrylic resin sheets of a thickness outside the foregoing thickness range according to uses, molding conditions and desired physical properties of the surface. Particularly, it is preferable to use acrylic resin sheets of an acrylic resin having a glass transition temperature Tg of 80° C. or below to reduce thermal energy necessary for heating the acrylic resin sheet during injection molding or during preforming, to suppress heating temperature on a low level, to reduce cycle time and to facilitate the manufacture and handling of the acrylic resin sheets. Although the abrasion resistance of an acrylic resin sheet having a low glass transition temperature Tg is low, problems resulting from the low abrasion resistance can be solved when the acrylic resin sheet has a coefficient of kinetic friction of 0.9 or below with respect to a flat glass plate, which will be described later.

The coefficient of kinetic friction of the acrylic resin sheet with respect to a flat glass plate was measured by the following procedure comprising the steps of placing the acrylic resin sheet on the surface of the flat glass plate, placing a 10 mm square plate of 1 mm in thickness wrapped in gauze on the acrylic resin sheet, putting a 10 g weight on the plate, measuring tensile force required to pull the weight at a moving speed of 1 m/min by 10 cm by a suitable measuring means, such as a spring balance or a strain gage, while the weight is being pulled, and repeating the tensile force measuring step five times. The mean of the five pieces of data thus obtained is divided by the weight of the weight to determine a coefficient of kinetic friction.

If an acrylic resin sheet has a coefficient of kinetic friction with respect to a flat glass plate exceeding 0.9, a stress is concentrated on the acrylic resin sheet and the surface is damaged when the acrylic resin sheet is rubbed by other body. If an acrylic resin sheet has a coefficient of kinetic friction with respect to a flat glass plate below 0.2, the abrasion resistance of the acrylic resin sheet is satisfactory, but the acrylic resin sheet slips on the mold, and is dislocated, creased, strained or broken and cannot be held in place on the surface of the mold defining the cavity against a shearing force exerted thereon by a resin injected into the cavity of the mold. The coefficient of kinetic friction of the acrylic resin sheet with respect to a flat glass plate can be reduced by coating the surface of the acrylic resin sheet with a silicon fluoride resin or the like or by selectively determining a lubricant contained in the resin forming the acrylic resin sheet and properly adjusting the lubricant content of the acrylic resin sheet. Table 1 shows possible lubricants classified by chemical structure. These lubricants are used individually or two or more of those lubricants are used in combination.

TABLE 1

| 1. Hydrocarbons | Pure hydrocarbons | Liquid paraffins |
| --- | --- | --- |
| | | Natural paraffins |
| | | Microwaxes |
| | | Synthetic paraffins |
| | | Polyethylene waxes |
| | Chlorinated hydrocarbons | |
| | Fluorocarbons | |
| 2. Fatty acids | Higher acids | |
| | Hydroxy fatty acids | |
| 3. Fatty amides | Fatty amides | |
| | Alkylene bisphenylic amides | |
| 4. Esters | Fatty lower alcohol esters | |
| | Fatty polyhydric alcohol esters | |
| | Fatty polyglycol esters | |
| 5. Alcohols | Fatty alcohols | |
| | Polyhydric alcohols | |
| | Polyglycols, polyglycerols | |
| 6. Metal soaps | | |
| 7. Mixtures | | |

In hydrocarbon lubricants, liquid paraffins have a pour point in the range of −15 to −35° C., natural paraffins have a relatively low melting point in the range of 57 to 63° C. are colorless and odorless and are excellent in lubricity, microwaxes are microcrystalline waxes obtained from petroleum having principal components similar to those of paraffin waxes, have a large molecular weight, have a carbon number in the range of thirty-two to seventy-two, contain a relatively large amount of isoparaffins and exercise a behavior different from that of paraffin waxes, and polyethylene waxes are low-molecular-weight polyethylenes or their incomplete oxides having a molecular weight in the range of 1500 to 200 and a softening point of 100° C. or above and are superior to other external lubricants in internal lubricity. Chlorinated naphthalene is a representative of chlorinated hydrocarbons, and is satisfactory in compatibility, difficult to be clouded and flame-resistant.

Stearic acid among the fatty acid lubricants is most prevalently used and those having a carbon number greater than that of lauric acid may be used as a lubricant.

Fatty acid amide lubricants are amides derived from fatty acids and have a general chemical structure represented by $R-CONH_2$.

Fatty acid amide lubricants are compounds produced by substituting hydrogen atoms of ammonia by acyl groups generally and including primary amides represented by $R-CONH_2$, secondary amides represented by $(R-CO)_2NH$ and tertiary amides represented by $(R-CO)_3N$. A compound simply called acid amide is a primary amide. Secondary amides are imides or acetic imides. Amide compounds suitable for use as a lubricant include stearic amide, palmitic imide, methylene bisstearoamide and ethylene bisstearoamide. These lubricants are white or light yellow powder or solid having a relatively high melting point in the range of 100 to 140° C. Fatty amide lubricants are excellent in external lubrication.

Ester lubricants are fatty lower alcohol esters, fatty polyhydric alcohol esters and fatty polyglycol esters. Butyl stearate is a generally used fatty lower alcohol ester having a melting point of 22.5° C. and is a colorless, transparent liquid at an ordinary temperature.

Principal alcohol lubricants are those having a relatively high melting point and a carbon number of sixteen or above, such as cetyl alcohol and stearyl alcohol.

Metal soaps are those derived from fatty acids having a carbon number in the range of twelve to thirty. A stearate, such as lead stearate functions as a stabilizer and a lubricant.

The order in lubricity of those lubricants is metal soaps >liquid composite stabilizers>inorganic stabilizers>organic tin compounds>S-containing organic lead compounds.

The lubricant content of the acrylic resin sheet is dependent on the kind of the acrylic resin forming the acrylic resin sheet and the kind of the lubricant. Usually the lubricant content of the acrylic resin sheet to provide the acrylic resin sheet with a desired frictional property is in the range of about 0.1 to about 10% by weight. It is preferable that the lubricant content is in the range of 0.1 to 0.5% by weight if transparency of the acrylic resin sheet is important.

An acrylic resin sheet is subjected to a desired decorating process to obtain a decorative sheet. The decorating process colors an acrylic resin sheet by mixing a pigment or a dye in the acrylic resin sheet, forms a pattern on the acrylic resin sheet by a pattern sheet or a metal film or forms a pattern by embossing.

An ultraviolet absorbing agent and/or a light stabilizer may be added to a base sheet to provide a decorative sheet having improved fading resistance (weather resistance). The base sheet may contain only an ultraviolet absorbing agent, but the ultraviolet absorbing agent is more effective when used in combination with a light stabilizer. Suitable ultraviolet absorbers are organic ultraviolet absorbing agents including benzotriazoles, benzophenones and salicylates, and inorganic powders of 0.2 μm or below in grain size of zinc oxide, cerium oxide and titanium oxide. Suitable light stabilizers may be hindered amine radical trapping agent, such as bis-(2,2,2,6,6-tetramethyl-4-piperidyle) sebacate. Usually the ultraviolet absorbing agent content and the light stabilizer content of the resin are in the range of about 0.1 to about 10% by weight. If the ultraviolet absorbing agent content and the light stabilizer content are less than about 0.1% by weight, the light stability of the base sheet is unsatisfactory, If the ultraviolet absorbing agent content and the light stabilizer content are greater than about 10% by weight, the base sheet may be colored. The effects of the ultraviolet absorbing agent and the light stabilizer do not increase as expected with the increase of ultraviolet absorbing agent content and light stabilizer content, and the agents, particularly, organic agents, may possibly bleed out if ultraviolet absorbing agent content and light stabilizer content are increased excessively beyond about 10% by weight.

Patterns may be formed on the base sheet by an ordinary printing process, such as a gravure printing process, an offset printing process, a relief printing process or a screen printing process, or may be drawn by hand. Patterns may be printed on the base sheet by a transfer printing process which uses a transfer sheet provided with a pattern layer (ink layer) and, if necessary, an adhesive layer, and transfers the pattern layer to the base sheet by placing the transfer sheet on the base sheet and applying pressure, or pressure and heat to the transfer sheet. Suitable materials as the binder of the ink for forming the pattern are acrylic resins, vinyl acetate resins, vinyl chloride-vinyl acetate copolymers, saturated polyesters and mixtures of some of those materials. The ink is prepared by mixing a material as binder, and a pigment, such as titanium oxide white, carbon black, phthalocyanine blue, iron oxide red isoindolinone or the like, or a dye. The pattern may be of any optional kind such as resembling a grain of wood. a texture of stone, a texture of fabric, letters, a geometric pattern, a pattern of hide or skin or the like, or the base sheet may be colored in a solid color.

A metal pattern is formed by the vacuum evaporation of a metal, such as aluminum, chromium, gold, silver, copper or the like. The surface of the base sheet may be coated with either a solid film of a metal or a pattern of a metal. A metal pattern may be formed by a known pattern forming process which, for example, coats regions of the surface of the base sheet in which any metal film need not be formed with a mask of a water-soluble ink, deposits a metal film over the entire surface of the base sheet by vacuum evaporation, and removes unnecessary portions of the metal film together with the mask by washing using water. A metal layer formed on a transfer sheet may be transferred by a transfer printing process to a surface of the base sheet on which a pattern (metal layer) is to be formed.

A relief pattern may be formed by any suitable relief pattern forming process, such as a hairline forming process, a sandblasting process, an embossing process or the like. A relief pattern can be formed on the surface of an acrylic resin sheet by any one of those relief pattern forming processes.

An embossing process uses a sheet-fed or rotary embossing machine of a hot-press type which heats an acrylic resin sheet for softening, presses an embossing plate against the surface of the softened acrylic resin sheet to shape the surface in a relief pattern. Representative relief patterns formed by such an embossing process are those imitating the vascular grooves of wood, the surface and grain of wood, the rugged surface of stone, the texture of fabric, a satin-finished surface, a pebble-grained surface, hairlines and the like, or combinations of those patterns. If necessary, the concave portions of the relief pattern are filled up with a color ink by a known wiping method. Color inks prepared by mixing a pigment or dye in a vehicle, such as an acrylic resin, a polyester resin or the like are used selectively. Preferably, the color ink is a two-component setting adhesive containing a pigment or a dye, and having satisfactory adhesion and solvent resistance. The wiping method may be achieved by a known wiping process, such as a doctor blade process or a roll coating process. The entire surface of the acrylic resin sheet provided with a relief pattern is coated with the color ink by any one of the foregoing coating processes, portions of the film of the color ink coating convex portions of the relief pattern are scraped off so that the color ink remains only in the concave portions of the relief pattern.

Suitable materials for forming the backing sheet are polyvinyl chloride, polyvinylidene chloride, vinyl copolymers, such as vinyl acetate-vinyl chloride copolymers and ethylene-vinyl alcohol copolymers, styrene resins, such as polystyrene, acrylonitrile-styrene copolymers and ABS, acrylic resins and polyacrylonitrile resins.

A sheet-decorating molding method is a well-known technique. A sheet-decorating molding method integrates a decorating sheet held between the male and the female mold of an injection mold and a resin injected into a cavity formed in the injection mold by injection molding to decorate the surface of a molding. The decorative sheet is affixed to the surface of a molding so that the decorative sheet is integrated with the molding to form a decorative layer on the surface of the molding. Desirably, the decorative sheet is preformed by a vacuum forming method or a vacuum-pressure forming method prior to injection molding so that the decorative sheet is formed so as to conform to the inner surface of the female mold. A preforming method preforms a decorative sheet in a preforming mold and places the preformed decorative sheet in the female mold of an injection mold, another preforming method preforms a decorative sheet in the female mold of an injection mold. Usually, the latter preforming method is used prevalently. Naturally, the preforming process may be omitted and a decorative sheet may be formed so as to conform to the shape of the inner surface of the female mold if the height of the protruding portions of the molding is not very great, the curvatures of curved portions of the molding are relatively small or the decorative sheet has a sufficiently high moldability (thermoplasticity).

FIG. 1 shows an injection molding machine 10 which uses an injection mold having a female mold 20 and a male mold 30 and preforms a decorative sheet S on the female mold 20. The female mold 20 is provided with suction holes 21 through which air is sucked for the vacuum forming of the decorative sheet S in a shape corresponding to a portion of a molding to be molded in a cavity formed in the injection mold closed by joining together the female mold 20 and the male mold 30. The male mold 30 is fixed to a stationary platen 31 fastened to four tiebars 40. The female mold 20 is fixed to a movable platen 22 supported on the tiebars 40 for sliding movement along the tiebars 40. When preforming the decorative sheet S, the decorative sheet S inserted between the female mold 20 and the male mold 30 is clamped on the female mold 20 mounted on the movable platen 22 by a sheet clamp 50, the decorative sheet S is heated and softened by a hot plate 60, air is sucked through the suction holes 21 to attract the decorative sheet S closely by suction to the inner surface of the female mold 20 defining part of a cavity.

An upper end portion of the decorative sheet S is gripped by a sheet chuck 70 and is cut off by a sheet cutter 80. The sheet cutter 80 may be a knife, a hot wire or the like. Then, the decorative sheet S is cooled to complete the preforming of the decorative sheet S. A resin may be injected into the cavity before the decorative sheet S cools off. The hot plate 60 may be of either a contact type which is brought into close contact with the decorative sheet S to heat the decorative sheet S by thermal conduction or a noncontact type which is held apart from the decorative sheet S to heat the decorative sheet S by radiant heat or by dielectric heating.

If the decorative sheet S is preformed on a separate vacuum forming process or a vacuum-pressure forming process, a mold provided with the same hollow as that of the female mold 20 is used, the decorative sheet S is heated and softened by heating by an infrared heater or the like, the decorative sheet S is formed so as to conform to the inner surface of the mold, the decorative sheet S thus preformed is released from the mold, and then the preformed decorative sheet S is put in place on the female mold 20 to complete a preforming process.

Figure 2:
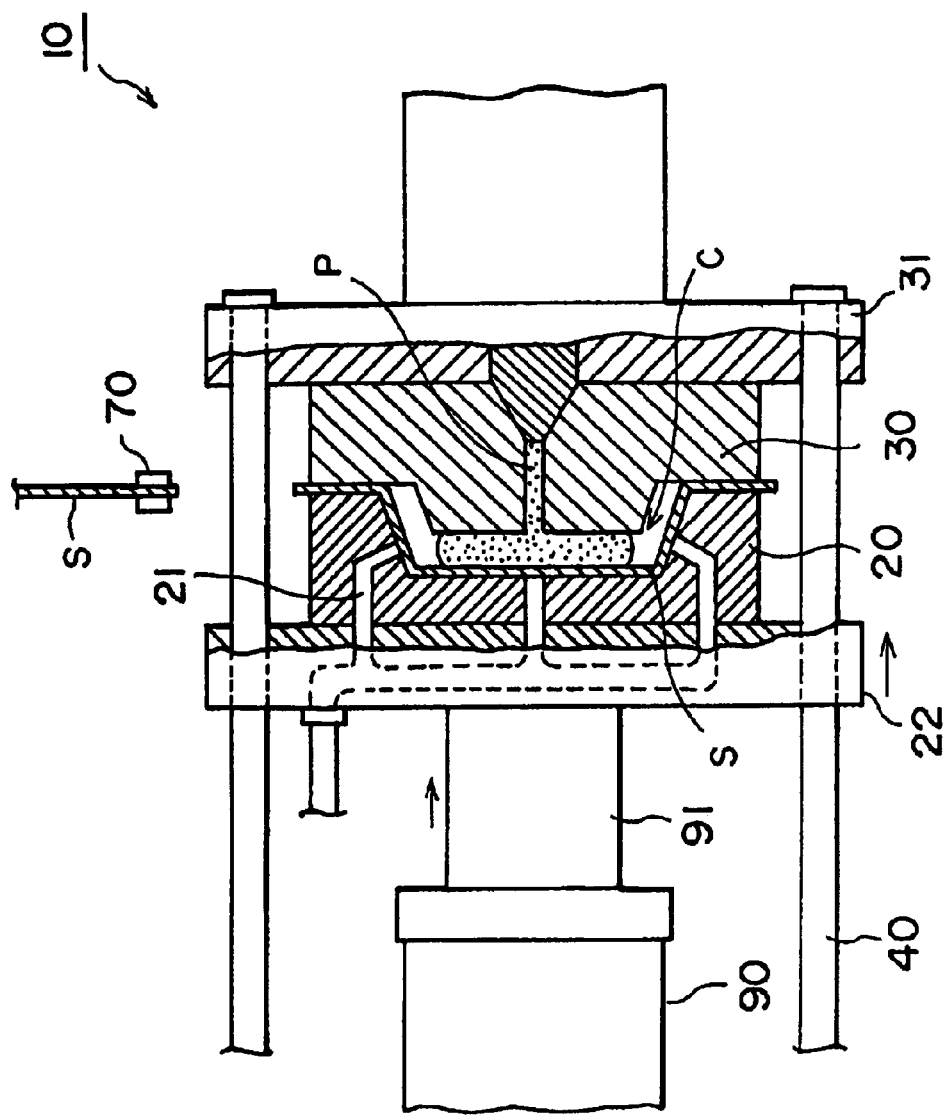
FIG. 2 is a partly sectional view of the injection molding machine of FIG. 1 in an injection molding process for injecting a fluid resin into a cavity of the injection mold holding the preformed decorative sheet.
Figure 3:
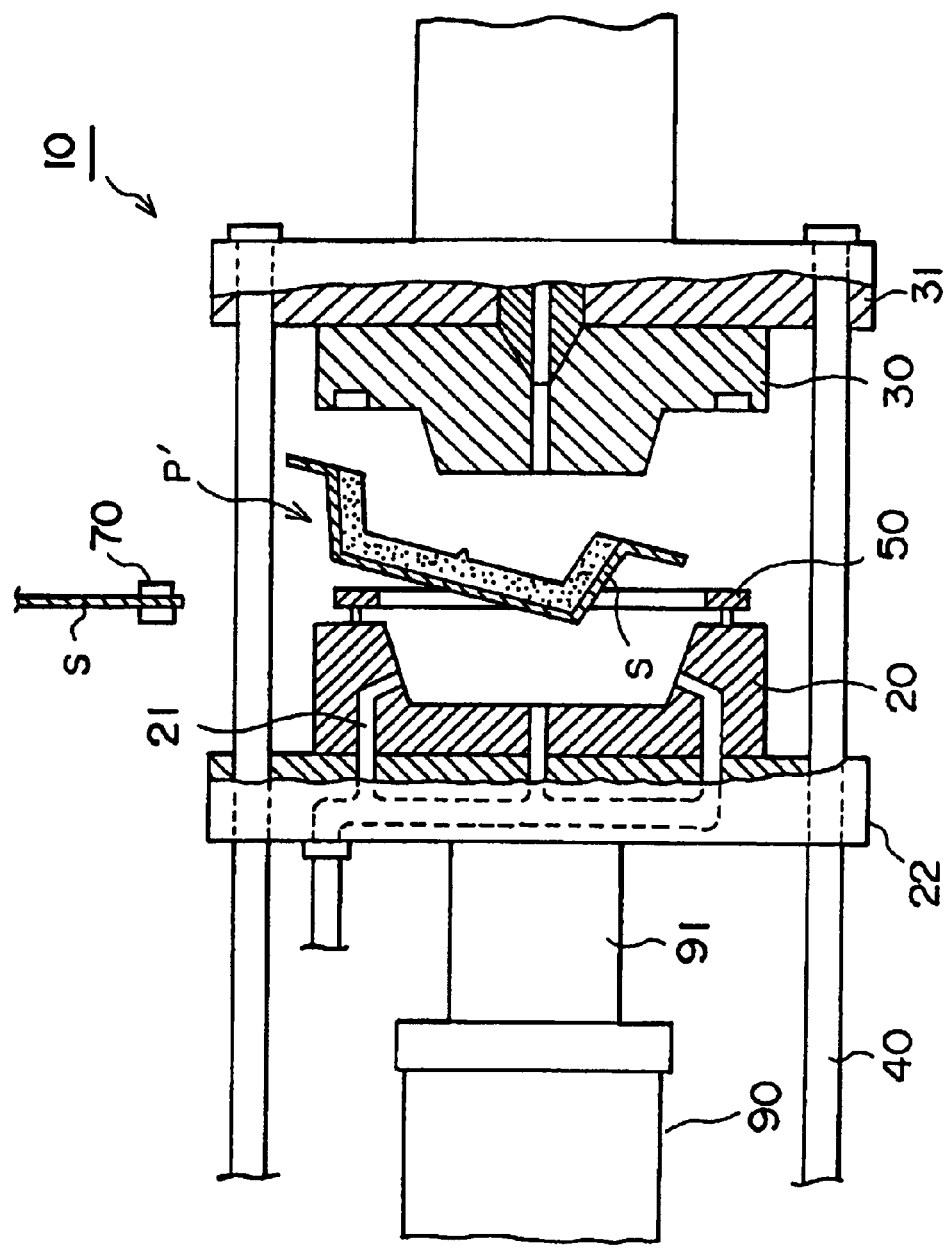
FIG. 3 is a partly sectional view of the injection molding machine of FIG. 1 in an ejecting process for opening the injection mold and ejecting a resin molding from the injection mold.

After the decorative sheet S has been preformed as shown in FIG. 1, a piston 91 of a hydraulic cylinder 90 is extended to move the movable platen 22 holding the female mold 20 holding the decorative sheet S in close contact with the inner surface thereof along the tiebars 40 toward the male mold 30, the female mold 20 is joined to the male mold 30 to clamp the injection mold, a fluid resin P for forming a molding is injected through a gate 32 formed in the male mold 30 into a cavity C defined by the female mold 20 and the male mold 30 so that the cavity C is filled up with the resin P as shown in FIG. 2. After the resin P injected into the cavity C has solidified, and the decorative sheet S has been laminated to a resin molding P', the female mold 20 is separated from the male mold 30 to open the injection mold as shown in FIG. 3, and then the resin molding P' having a surface decorated by the decorative sheet S is ejected from the injection molding. The female mold 20 and the male mold 30 are made of a metal, such as iron, or a ceramic material.

The resin to be used for forming the resin molding P' is determined selectively taking into consideration the required physical properties and the cost of the resin molding P'. More concretely, the resin molding P' may be produced by preparing a molten resin by heating and melting an acrylonitrile-butodiene-styrene copolymer (ABS resin), a polystyrene resin, an acrylonitrile-styrene copolymer, a polyvinyl chloride resin, a polypropylene resin, a polyethylene resin, a polycarbonate resin or an acrylic resin, injecting the molting resin into the cavity and cooling the molten resin filling up the cavity to make the same solidify, or by injecting a liquid two-component setting resin, such as a polyurethane resin containing polyol and an isocyanate crosslinking agent, a mixture of an epoxy resin and amine as hardener, or a mixture of an unsaturated polyester resin and an isocyanate, an organic sulfonate or dibenzoil peroxide as hardener, and making the two-component setting resin solidify by chemical reaction.

EXAMPLES

Two sample sheets A and B of 125 $\mu$m in thickness of an acrylic resin containing MMA/acrylonitrile-butadiene rubber as principal components, and a lubricant (fatty alcohol) in different contents, respectively, and having a glass transition point Tg of 73° C., and a sample sheet C of 125 $\mu$m in thickness of an acrylic resin having a glass transition point Tg of 85° C. were produced. A sample sheet D was produced by coating a surface of the same sheet as the sample sheet A with a 2 $\mu$m thick acryl silicone resin film by gravure printing. The sample sheets A, B, C and D were subjected to the measurement of coefficient of kinetic friction with respect to a flat glass plate. Measured results are tabulated in Table 2.

TABLE 2

| Samples | Tg (° C.) | Coef. of Kinetic friction | Lubricant (%) |
| --- | --- | --- | --- |
| A | 73 | 0.45 | 0.2 |
| B | 73 | 1.0 | 0.05 |
| C | 85 | 0.6 | 0.15 |
| D | 73 | 0.16 | 0.2 |

Pattern layers (decorative layers) and adhesive layers were formed on the sample sheets A, B, C and D, respectively, to obtain sample decorative sheets A', B', C' and D'. The sample sheet C was provided with the pattern layer and the adhesive layer on a surface opposite the surface coated with silicone. The pattern layers were formed of inks each prepared by mixing a pigment and a mixture of one part by weight of acrylic resin and one part by weight of a vinyl chloride-vinyl acetate copolymer. A pattern imitating a grain of wood was printed by a conventional gravure printing process using three pattern plates. The adhesive layer was formed in a thickness of 2 $\mu$m by repeating a conventional gravure printing process using a conventional gravure solid plate of 40 line/cm in screen ruling and 60 $\mu$m in cell depth twice.

Sheet-decorated moldings were produced by the sheet-decorating molding method using the sample decorative sheets A', B', C' and D' by the injection molding machine shown in FIGS. 1 to 3. A molten heat-resistant ABS resin of 250° C. was injected into the cavity of the injection mold of iron heated at 60° C. Each sample decorative sheet was clamped on the female mold 20 held on the movable platen 22 with the pattern layer thereof facing the gate 32 of the male mold 30. The sample decorative sheet was heated by a hot plate heated at 300° C. in surface temperature and disposed at a distance of 30 mm from the decorative sheet for heating and softening. The thus heated and softened sample decorative sheet was attracted closely to the inner surface of the female mold 20 by suction, the injection mold was clamped and the molten heat-resistant ABS resin was injected into the cavity of the injection mold. The sample decorative sheets A', B' and D' could be properly heated in 8 sec, while the sample decorative sheet C' needed 13 sec to heat the same properly. The coefficient of kinetic friction of the sample decorative sheet D' with respect to a flat glass plate was excessively small and the same sample decorative sheet D' was dislocated on the female mold 20 and creased by a shearing stress induced therein by the heat-resistant ABS resin injected into the cavity, and the sheet-decorated molding decorated by the sample decorative sheet D' had a defective appearance.

Test samples were prepared by cutting flat portions of the thus produced sheet-decorated moldings, and the test samples were subject to abrasion resistance tests using a Gakushin type abrasion tester. A 20 mm sq. loading plate wrapped in gauze was pressed against the test sample by a force of 200 g, and the loading plate was reciprocated 500 times. The surfaces of the test samples thus rubbed were inspected visually. Any conspicuous scratches were not found on the test samples cut from the sheet-decorated moldings coated with the sample decorative sheets A', B' and D', and conspicuous scratches were found on the test sample cut from the sheet-decorated molding coated with the sample decorative sheet B'. Only the sample sheet A of the acrylic resin met the requirements of formability, cycle time and abrasion resistance.

Although the acrylic resin decorative sheet of the present invention having a coefficient of kinetic friction in the range of 0.2 to 0.9 with respect to a flat glass plate is not coated with a hard coating film, which deteriorate formability, the acrylic resin decorative sheet has high abrasion resistance, is not creased, broken, strained or dislocated by a stress induced therein by the high-pressure liquid resin injected into the cavity of the injection mold. The acrylic resin sheet of an acrylic resin having a glass transition temperature Tg of 80° C. or below requires small thermal energy necessary for heating the acrylic resin sheet during injection molding and during preforming, a relatively low heating temperature, and reduces molding cycle time.

Although the invention has been described in its preferred form with a certain degree of particularity, obviously many changes and variations are possible therein. It is therefore to be understood that the present invention may be practiced otherwise than as specifically described herein without departing from the scope and spirit thereof.

What is claimed is:

1. A decorative sheet for use in a sheet-decorating injection molding method, said decorative sheet consisting essentially of an acrylic resin selected from the group consisting of polymethyl(meth)acrylate, polyethyl(meth)acrylate, poly-butyl(meth)acrylate, methyl(meth)acrylate-butyl (meth)acrylate copolymers, methyl(meth)acrylate-ethyl (meth)acrylate copolymers, ethyl(meth)acrylate-butyl (meth)acrylate copolymers, and (meth)-acrylate-styrene copolymers, which contains a lubricant in an amount to give a coefficient of kinetic friction with respect to a flat glass plate in a range of 0.2 to 0.9.

2. The decorative sheet according to claim 1, wherein said acrylic resin has a glass transition temperature of 80° C. or below.

3. The decorative sheet of claim 1, wherein the lubricant is selected from the group consisting of a hydrocarbon, a fatty acid, a fatty amide, an ester, an alcohol, a metal soap, and mixtures thereof.

4. The decorative sheet of claim 1, wherein the lubricant is present in an amount of about 0.1 to about 10% by weight.

5. A decorative sheet consisting essentially of an acrylic resin that is a member selected from the group consisting, of polymethyl(meth)acrylate, polyethyl(meth)acrylate, poly-butyl(meth)acrylate, methyl(meth)acrylate-butyl(meth) acrylate copolymers, methyl(meth)acrylate-ethyl(meth) acrylate copolymers, ethyl(meth)acrylate-butyl(meth) acrylate copolymers, and (meth)-acrylate-styrene copolymers, said acrylic resin containing a lubricant in an amount to give a coefficient of kinetic friction with respect to a flat glass plate in the range of 0.2 to 0.9, said acrylic resin having a glass transition temperature of 80° C. or below.

6. The decorative sheet of claim 5, further comprising a backing resin sheet laminated to one surface of the decorative sheet.

7. The decorative sheet of claim 5, wherein the lubricant is selected from the group consisting of a hydrocarbon, a fatty acid, a fatty amide, an ester, an alcohol, a metal soap, and mixtures thereof.

8. The decorative sheet of claim 5, wherein the lubricant is present in an amount of about 0.1 to about 10% by weight.

9. A sheet-decorated molding having a surface coated with a decorative sheet consisting essentially of an acrylic resin that is a member selected from the group consisting of polymethyl(meth)acrylate, polyethyl(meth)acrylate, poly-butyl(meth)acrylate, methyl(meth)acrylate-butyl(meth) acrylate copolymers, methyl(meth)acrylate-ethyl(meth) acrylate copolymers, ethyl (meth) acrylate-butyl (meth) acrylate copolymers, and (meth)-acrylate-styrene copolymers, said acrylic resin containing a lubricant in an amount to give a coefficient of kinetic friction with respect to a flat glass plate in the range of 0.2 to 0.9, said acrylic resin having a glass transition temperature of 80° C. or below.

10. The sheet-decorated molding of claim 9, further comprising a backing resin sheet interposed between the molding and the decorative sheet.

11. The sheet-decorated molding of claim 9, wherein the lubricant is selected from the group consisting of a hydrocarbon, a fatty acid, a fatty amide, an ester, an alcohol, a metal soap, and mixtures thereof.

12. The sheet-decorated molding of claim 9, wherein the lubricant is present in an amount of about 0.1 to about 10% by weight.

* * * * *